United States Patent [19]

van Es et al.

[11] Patent Number: 5,258,215
[45] Date of Patent: Nov. 2, 1993

[54] METHOD OF COEXTRUDING A PLATE-SHAPED PRODUCT AND THE PRODUCTS THUS OBTAINED

[75] Inventors: Peter W. van Es, Hoogerheide; Petrus J. Plompen, Bergen op Zoom, both of Netherlands

[73] Assignee: General Electric Company, Pittsfield, Mass.

[21] Appl. No.: 979,709

[22] Filed: Nov. 20, 1992

Related U.S. Application Data

[63] Continuation of Ser. No. 707,737, May 30, 1991.

[30] Foreign Application Priority Data

Jun. 5, 1990 [NL] Netherlands ............ 9001264

[51] Int. Cl.$^5$ .............. B32B 27/06; B32B 27/28
[52] U.S. Cl. .................................. 428/64; 428/412
[58] Field of Search ............... 428/64, 412; 264/171

[56] References Cited

U.S. PATENT DOCUMENTS

| | | | |
|---|---|---|---|
| 4,098,734 | 7/1989 | Lee | 524/423 |
| 4,477,521 | 10/1984 | Lehmann et al. | 428/336 |
| 4,526,926 | 7/1985 | Weber et al. | 525/67 |
| 4,576,870 | 3/1986 | Liebler et al. | 264/171 |
| 4,656,225 | 4/1987 | Boutni et al. | 525/67 |
| 4,707,393 | 11/1987 | Vetter | 264/171 |
| 4,868,244 | 9/1989 | Boutni | 525/67 |
| 4,885,335 | 12/1989 | Gallucci et al. | 525/67 |
| 4,885,336 | 12/1989 | Boutni et al. | 525/67 |
| 4,902,743 | 2/1990 | Boutni | 525/67 |
| 4,906,689 | 3/1990 | Boutni | 525/67 |
| 4,937,031 | 6/1990 | Curry | 264/171 |
| 4,970,041 | 11/1990 | Macy et al. | 264/171 |

FOREIGN PATENT DOCUMENTS

| | | | |
|---|---|---|---|
| 0010646 | 5/1980 | European Pat. Off. | |
| 0065619 | 5/1981 | European Pat. Off. | |
| 0110221 | 11/1982 | European Pat. Off. | |
| 2832676 | 7/1978 | Fed. Rep. of Germany | |
| 52-63954 | 5/1977 | Japan | |
| 61-57322 | 3/1986 | Japan | 264/171 |
| 61-68231 | 4/1986 | Japan | 264/171 |
| 61-118236 | 6/1986 | Japan | 264/171 |
| 2028228 | 3/1980 | United Kingdom | |

*Primary Examiner*—Alexander S. Thomas

[57] ABSTRACT

The invention relates to a method for the coextrusion of a plate-shaped product. In the method according to the invention at least one coating layer is provided by means of coextrusion which is composed of a special polymer mixture. This mixture enables obtaining a matt surface and can be provided very uniformly on the major layer of polycarbonate by coextrusion. The polymer mixture comprises 84–92% by weight of polycarbonate, 4–8% by weight of talcum and 4–8% by weight of a mattifying agent based on acrylate copolymers.

4 Claims, No Drawings

METHOD OF COEXTRUDING A PLATE-SHAPED PRODUCT AND THE PRODUCTS THUS OBTAINED

This is a continuation of application Ser. No. 07/707,737 filed on May 30, 1991 now pending.

BACKGROUND OF THE INVENTION

The invention relates to a method of coextruding a plate-shaped product built up from a major layer consisting substantially of a polycarbonate on which a coating layer has been provided on at least one side.

The invention also relates to the products thus obtained.

It is generally known to manufacture plate-shaped products from synthetic resins, for example, polycarbonates, by means of extrusion. For certain applications there exists a need for plate-shaped products having a matt surface. Polycarbonate itself has a shiny surface after extrusion.

In order to obtain an extruded product consisting of polycarbonate and having a matt surface, various possibilities are to be considered in principle. By incorporating certain additives, the gloss of the polycarbonate may be reduced. For example, it is known that the gloss of polycarbonate can be reduced by the addition of certain types of ABS resins. Special mattifying agents for synthetic resins are also commercially available, for example, the products based on acrylate copolymers. In order to obtain a reduction of the gloss to a value of 75% (according to ISO 2813-78) 10% by weight of ABS should be added. In practice problems occur in processing a PC-ABS (90/10) mixture: the gloss depends to a considerable extent on the extrusion conditions. It has been found experimentally that a quantity of approximately 20% by weight of acrylate copolymers has to be added to polycarbonate to reach a gloss value of 75%. However, as a result of such a large quantity the mechanical properties of the extruded product deteriorate.

SUMMARY OF THE INVENTION

In order to avoid the problems described hereinbefore, the method according to the invention uses coextrusion in which a product is manufactured from a major layer consisting substantially of polycarbonate and at least one coating layer consisting of a polymer mixture which after coextrusion results in a matt surface. When a coating layer consisting of 80% by weight of polycarbonate and 20% by weight of the above-mentioned acrylate copolymer is provided by means of coextrusion, problems occur: it is substantially impossible to obtain a coating layer having a uniform thickness.

The invention is based on the discovery that it is possible to obtain a coating layer having a very low gloss and a very uniform thickness by using a certain polymer mixture for the coating layer.

DETAILED DESCRIPTION OF THE INVENTION

In the method according to the invention the coating layer is obtained by coextrusion of a polymer mixture which comprises 84-92% by weight of polycarbonate, 4-8% by weight of talcum and 4-8% by weight of a mattifying agent based on acrylate copolymers.

It has been found that the mixture mentioned hereinbefore is exceptionally suitable for coextrusion: 1) with this mixture it is possible to obtain a coating layer of a uniform thickness without any problems, and 2) the combination of talcum and acrylate copolymer mattifying agent shows a synergistic effect with respect to the gloss reduction.

In the method according to the invention talcum having an average particle size of 4-5 micrometers is preferably used in the polymer mixture for the coating layer.

The polymer mixture for the coating layer is preferably prepared by compounding in an extruder, in which the particle size of the acrylate copolymer which is used as a starting product and the extrusion conditions are matched to each other so that the acrylate copolymers are dispersed in the polymer mixture in a particle size of less than 10 micrometers.

In addition to the constituents mentioned hereinbefore, the polymer mixture for obtaining the coating layer may comprise further conventionally used additives, for example, pigments, dyes and stabilisers.

The manufacture of plate-shaped products by means of coextrusion is generally known. For this purpose, reference may be made, for example, to DE-A-2832676, EP-A-0065619 and EP-A-0110221. These known methods permit obtaining of plate-shaped products from polycarbonate having coating layers. The methods described in the said patent publications are in themselves suitable for the coextrusion according to the invention.

EXAMPLE 1, EXPERIMENTAL COMPARATIVE EXAMPLES A AND B

The following constituents are used for the preparation of the polymer mixture for the coating layer:

PC: an aromatic polycarbonate derived from bisphenol A and phosgene having a weight-averaged molecular weight of 30,000

Talcum: a talcum having an average particle size of 4.5 micrometers and the following particle size distribution: 0-2 micrometer (21%); 2-5 micrometers (32%); 5-10 micrometers (33%); 10-20 micrometers (13%) and 20-30 micrometers (1%)

Acrylate copolymer: a mattifying agent commercially available from Messrs. Rohm & Haas as KF 710 and built up substantially from butyl acrylate styrene and grafted thereon methyl methacrylate, a material in powder form having a particle size smaller than 0.5 millimeter.

These constituents were compounded in the quantities recorded in Table A hereinafter in the extruder for the coating layer associated with the coextruder. Extrusion conditions 300-320° C., 43 rpm, two minutes residence time in the extruder.

After the extrusion the particle size of the mattifying agent in the coating layer was determined.

TABLE A

| polymer mixture no. | I | A | B |
| --- | --- | --- | --- |
| Composition parts by weight | | | |
| PC | 88 | 80 | 94 |
| Talcum | 6 | — | 6 |
| Acrylate copolymer | 6 | 20 | — |
| pigment (carbon black) | 2.5 | 2.5 | 2.5 |
| Particle size acrylate copolymer after coextrusion | approx. 1-5 micrometer | 1 micrometer to 0.5 mm* | — |

*It was substantially impossible to obtain a complete dispersion of small particles.

Three different plate-shaped products were manufactured in the coextruder having a major layer (thickness 3 mm) consisting of the polycarbonate mentioned hereinbefore. The material for the major layer was extruded in the main extruder of the coextruder at 300-320° C., 170 rpm and 1 minute residence time. The coating layer consisting of polymer mixtures I, A and B, respectively, had a thickness of 0.3 mm. The gloss of the coating layer of the resulting products was measured according to the Gardner method at an angle of 85° (ISO 2813-78) and the variation in thickness was determined visually. The variation in thickness can easily be determined visually since the coating layer is black coloured and the major layer is transparent.

The resulting products were heated and the mattness after thermo-shaping was evaluated visually.

The results are recorded in Table B hereinafter.

TABLE B

| Example | I | A | B |
| --- | --- | --- | --- |
| Polymer mixture used the coating layer no. | I | A | B |
| Gloss | 50 | 75 | 85 |
| Variation in thickness of the coating layer | none | very uneven | none |
| Gloss after thermo-shaping | no change to slight reduction | increase | no change to slight reduction |

It may be seen from the above results that the simultaneous addition of talcum and a mattifying agent (example I) leads to a very considerable reduction of the gloss. The presence of the talcum improves the extrudability, as appears from the examples I and B where no noticeable variation in the thickness of the coating layer occurs. The product according to the invention maintains its low gloss after thermoshaping.

All patent (aplications) mentioned herein are herewith incorporated by reference.

We claim:

1. A plate-shaped product having reduced gloss, and built up from a major layer comprising a polycarbonate on which a coating layer having a matte surface and a uniform thickness is provided on at least one side, wherein the coating layer is obtained by coextrusion of a polymer mixture which comprises 84-92% by weight of polycarbonate, 4-8% by weight of talcum and 4-8% by weight of a mattifying agent based on acrylate copolymers.

2. A plate-shaped product according to claim 1, wherein the talcum has an average particle size of 4-5 micrometers.

3. A plate-shaped product according to claim 1, wherein the acrylate copolymer mattifying agent is butyl acrylate styrene having methyl methacrylate grafted thereon.

4. A plate-shaped product according to claim 1, further comprising an additive selected from the group consisting of pigments, dyes, stabilizers, and mixtures thereof.

* * * * *